United States Patent
Kim et al.

(10) Patent No.: US 9,600,048 B2
(45) Date of Patent: Mar. 21, 2017

(54) DEVICES AND METHODS FOR CONTROLLING OPERATION OF ARITHMETIC AND LOGIC UNIT

(71) Applicant: Samsung Electronics Co., Ltd., Gyeonggi-do (KR)

(72) Inventors: Dohyoung Kim, Gyeonggi-do (KR); Joohwan Kim, Gyeonggi-do (KR); Hyunjin Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/717,014

(22) Filed: May 20, 2015

(65) Prior Publication Data
US 2015/0339163 A1 Nov. 26, 2015

(30) Foreign Application Priority Data
May 20, 2014 (KR) .................. 10-2014-0060569

(51) Int. Cl.
*G06F 9/46* (2006.01)
*G06F 1/32* (2006.01)

(52) U.S. Cl.
CPC .............. *G06F 1/32* (2013.01); *Y02B 60/142* (2013.01); *Y02B 60/144* (2013.01); *Y02B 60/167* (2013.01)

(58) Field of Classification Search
None
See application file for complete search history.

(56) References Cited

U.S. PATENT DOCUMENTS

| | | | | |
|---|---|---|---|---|
| 6,021,502 A | * | 2/2000 | Ando | G06F 1/206 713/300 |
| 7,237,128 B2 | * | 6/2007 | Naveh | G06F 1/3203 327/113 |
| 7,343,276 B1 | * | 3/2008 | Tsukamoto | G06F 17/5022 703/15 |
| 2008/0313640 A1 | | 12/2008 | Liu et al. | |
| 2012/0239952 A1 | * | 9/2012 | Nishiguchi | G06F 1/3206 713/320 |
| 2013/0232346 A1 | | 9/2013 | Wu | |

* cited by examiner

Primary Examiner — Gregory A Kessler
(74) Attorney, Agent, or Firm — Cha & Reiter, LLC.

(57) ABSTRACT

In various embodiments, devices and methods for controlling the operation of at least one arithmetic and logic unit are disclosed. In various embodiments, methods and devices for controlling an arithmetic logic unit are disclosed. More particularly, devices may comprise at least one arithmetic and logic unit for processing a task, and a processor for controlling the arithmetic and logic unit according to an electric current consumed by the arithmetic and logic unit at an operating frequency of the arithmetic and logic unit.

18 Claims, 9 Drawing Sheets

DEVICES AND METHODS FOR CONTROLLING OPERATION OF ARITHMETIC AND LOGIC UNIT

CLAIM OF PRIORITY

This application claims priority under 35 U.S.C. §119(a) to Korean Patent Application No. 10-2014-0060569, filed on May 20, 2014, which is hereby incorporated by reference for all purposes as if fully set forth herein.

TECHNICAL FIELD

The present disclosure relates to a method and device for controlling an operation of an arithmetic and logic unit

BACKGROUND

In recent years, with the development of information and communication technologies and semiconductor technologies, mobile electronic devices are being widely used. In mobile electronic devices operated by a battery, effective power consumption management is an important issue.

In order to process multiple tasks, the electronic devices calculate load values for task operations and control operations of arithmetic and logic units (e.g., a core, a CPU, etc.) based on the calculated load values. In the electronic devices, reduction of current consumption and enhancement of performance conflict with each other. Accordingly, methods capable of substantially reducing current consumption and improving performance are desired.

SUMMARY

In various embodiments, methods and devices for controlling an arithmetic logic unit are disclosed. More particularly, devices may comprise at least one arithmetic and logic unit for processing a task, and a processor for controlling the arithmetic and logic unit according to an electric current consumed by the arithmetic and logic unit at an operating frequency of the arithmetic and logic unit.

Methods may similarly comprise calculating a weighting value based on a measured value of electric current consumed, and determining the operating frequency of the arithmetic and logic unit by applying the calculated weighting value in order to select an arithmetic and logic unit to process a task.

As described above, according to various embodiments, the electronic device can calculate a weighting value according to current consumption previously measured for each operating frequency and configure a load measurement function based on the calculated weighting value, whereby the load measurement function can be modified according to the operating frequency. Therefore, a rapid increase or decrease in current consumption according to a hardware characteristic of an arithmetic and logic unit can be reflected, thereby preventing current from being unnecessarily consumed.

BRIEF DESCRIPTION OF THE DRAWINGS

The above features and advantages of the present disclosure will be more apparent from the following detailed description taken in conjunction with the accompanying drawings, in which.

DETAILED DESCRIPTION

Figure 1:
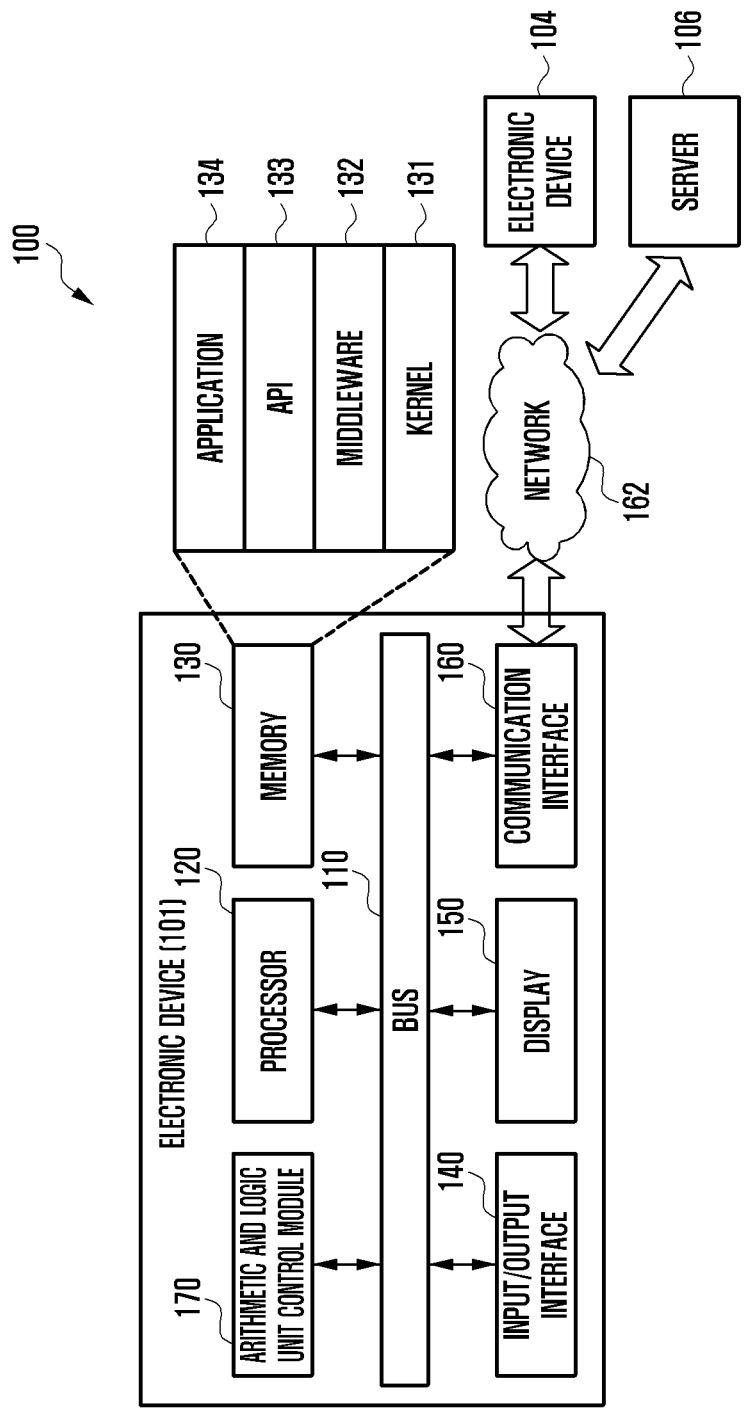
FIG. 1 illustrates a network environment including an electronic device, according to various embodiments of the present disclosure.

The following description is provided with reference to the accompanying drawings to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are merely used by the inventor to enable a clear and consistent understanding of the present disclosure. Accordingly, it should be apparent to those skilled in the art that the following description of various embodiments of the present disclosure is provided for illustrative purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "include" or "may include" refers to the existence of a corresponding function, operation, or element, and does not exclude one or more additional functions, operations, or elements. Also, as used herein, the terms "include" and/or "have" should be construed to denote a certain feature, number, step, operation, element, component or a combination thereof, and should not be construed to exclude the existence or possible addition of one or more other features, numbers, steps, operations, elements, components, or combinations thereof.

The expression "or" includes any or all combinations of words enumerated together. For example, the expression "A or B" may include A, may include B, or may include both A and B.

The expressions "a first', "a second", "the first", "the second", and the like may modify various elements, but the corresponding elements are not limited by these expressions. For example, the above expressions do not limit the sequence and/or importance of the corresponding elements. The above expressions may be used merely for the purpose of distinguishing one element from the other elements. For example, a first user device and a second user device indicate different user devices although both of them are user devices. For example, a first element may be termed a second element, and similarly, a second element may be termed a first element without departing from the scope of the present disclosure.

When an element is referred to as being "coupled" or "connected" to any other element, it should be understood that not only the element may be directly coupled or connected to the other element, but also a third element may be interposed therebetween. However, when an element is referred to as being "directly coupled" or "directly connected" to any other element, it should be understood that no element is interposed therebetween.

The terms used herein are used only to describe particular embodiments, and are not intended to limit the present disclosure. As used herein, the singular forms are intended to include the plural forms as well, unless the context clearly indicates otherwise.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure.

In various embodiments of the present disclosure, a "communication item" may be understood as communication content created based on one or more members. For example, the communication item may include at least one of a chatting room, address book, note, communication and email. A "communication item list" may be understood as a list in which communication items are arranged. For example, the communication item list may include at least one of a chatting room list, address book list, message list, note list, call list, and email list.

In various embodiments of the present disclosure, a "movement object" may be understood as one or more communication items which can be selected or moved from the communication list including communication items or movable information visually separated. The movement object may be displayed with at least one of a shape, size, color and effect different from those of the communication items, so as to be distinguished from the communication items.

An electronic device according to an embodiment of the present disclosure may be a device including a communication function. For example, the electronic device may include at least one of a smart phone, a tablet Personal Computer (PC), a mobile phone, a video phone, an e-book reader, a desktop PC, a laptop PC, a netbook computer, a PDA, a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic accessory, an electronic tattoo, and/or a smart watch.

According to various embodiments of the present disclosure, the electronic device may be a smart home appliance with a communication function. The smart home appliances may include at least one of, for example, televisions, digital video disk (DVD) players, audio players, refrigerators, air conditioners, cleaners, ovens, microwaves, washing machines, air purifiers, set-top boxes, TV boxes (e.g., Home-Sync™ of Samsung, Apple TV™, or Google TV™), game consoles, electronic dictionaries, electronic keys, camcorders, or electronic frames.

According to various embodiments of the present disclosure, the electronic device may include at least one of various types of medical devices (for example, Magnetic Resonance Angiography (MRA), Magnetic Resonance Imaging (MRI), Computed Tomography (CT), a scanning machine, ultrasonic wave device and the like), a navigation device, a Global Positioning System (GPS) receiver, an Event Data Recorder (EDR), a Flight Data Recorder (FDR), a car infotainment device, ship electronic equipment (for example, navigation equipment for a ship, a gyro compass and the like), avionics, a security device, and an industrial or home robot.

According to various embodiments of the present disclosure, the electronic device may include at least one of a part of furniture or a building/structure having a communication function, an electronic board, an electronic signature receiving device, a projector, and various kinds of measuring instruments (e.g., a water meter, an electric meter, a gas meter, a radio wave meter, and the like). The electronic device according to the present disclosure may be a combination of one or more of the aforementioned various devices. However, an electronic device according to an embodiment of the present disclosure is not limited to the aforementioned devices.

An electronic device according to various embodiments of the present disclosure is described below with reference to the accompanying drawings. The term "user" may refer to a person who uses an electronic device or a device (for example, an artificial intelligence electronic device) that uses an electronic device.

FIG. 1 is a diagram illustrating the network architecture 100 to an embodiment of the present disclosure.

Referring to FIG. 1, the network architecture 100 includes an electronic device 101, an electronic device 104, a server 106, and a network 162. The electronic device 101 includes a bus 110, a processor 120, a tangible, non-transitory, computer-readable medium or memory 130, an input/output interface 140, a display 150, a communication interface 160, and an arithmetic and logic unit (ALU) control module 170.

The bus 110 may comprise circuitry which connects the aforementioned components (e.g. memory 130, input/output interface 140, display 150, communication interface 160, and arithmetic and logic unit control module 170) to each other to communicate signals (e.g. control messages) therebetween.

The processor 120 receives a command from any of the aforementioned components (e.g. memory 130, input/output interface 140, display 150, communication interface 160, and arithmetic and logic unit control module 170) through the bus 110, interprets the command, and executes operation or data processing according to the (decrypted) command. The memory 130 may store the command or data received from the processor 120 or other components (e.g. input/output interface 140, display 150, communication interface 160, arithmetic and logic unit control module 170, etc.) or generated by the processor 120 or other components. The memory 130 may store program modules including kernel 131, middleware 132, Application Programming Interface (API) 133, applications 134, and the like. Each programing module may be implemented as software, firmware, hardware, and/or any combination thereof.

The kernel 131 may control or manage the system resources (e.g., bus 110, processor 120, and memory 130) for use in executing the operation or function implemented with the middleware 132, the API 133, or the application 134. The kernel 131 also may provide an interface allowing the middleware 132, API 133, or application 134 to access the components of the electronic device 101 to control or manage.

The middleware 132 may work as a relay of data communicated between the API 133 or application 134 and the kernel 131. The middleware 132 may execute control of the task requests from the applications 134 by assigning priority for use of system resources (e.g., bus 110, processor 120, and memory 130) of the electronic device to at least one of the applications 134.

The API 133 is the interface for the applications 134 to control the function provided by the kernel 131 or the middleware 132 and may include at least one interface or function (e.g., command) for file control, window control, image control, or text control.

The applications 134 may include Short Messaging Service/Multimedia Messaging Service (SMS/MMS) applications, email applications, calendar applications, alarm applications, health care applications (e.g., application of measuring quantity of motion or blood sugar level), and environmental information applications (e.g., atmospheric pressure, humidity, and temperature applications). Additionally or alternatively, the application 134 may be an application related to information exchange between the electronic device 101 and other external electronic device (e.g., electronic device 104). Examples of the information exchange application may include a notification relay application for relaying specific information to the external electronic device 104 and a device management application for managing the external electronic device.

For example, the notification relay application may be provided with a function of relaying the alarm information generated by the other applications (e.g., SMS/MMS applications, email applications, health care applications, and environmental information applications) of the electronic device to an external electronic device (e.g., the electronic device 104). Additionally or alternatively, the notification relay application may provide the user with the notification information received from an external electronic device (e.g., the electronic device 104). The electronic device application may manage (e.g., install, delete, and update) the function of an external electronic device (e.g., turn-on/off of the electronic device 104 itself (or a part of the electronic device 104) or adjustment of the brightness or resolution of the display) which communicates with the electronic device 101 or the service (e.g., communication or messaging service) provided by the external electronic device or an application running on the external device.

The applications 134 may include an application designated according to the property (e.g. type) of an external electronic device (electronic device 104). If the external electronic device is the MP3 player, the applications 134 may include a music playback application. Similarly, if the external electronic device is a mobile medical appliance, the applications 134 may include a health care application. The application 134 may include at least one application designated to the electronic device 101 or the applications received from the external electronic device (e.g., server 106 and electronic device 104).

The input/output interface 140 delivers the command or data input by the user through an input/output device (e.g. sensor, keyboard, and touchscreen) to the processor 120, memory 130, communication interface 160, and/or arithmetic and logic unit control module 170 by way of the bus 110. For example, the input/output interface 140 may provide the processor 120 with data entered by a user on a touchscreen. The input/output interface 140 may output the command or data (which is received from the processor 120, memory 130, communication interfaced 160, or the arithmetic and logic unit control module 170) through the input/output device (e.g. speaker and display). For example, the input/out interface 140 may output the voice data processed by the processor 120 to the user through the speaker.

The display 150 may present various information (e.g., multimedia data and text data) to the user.

The communication interface 160 may establish a communication connection of the electronic device 101 with an external device (e.g., the electronic device 104 and the server 106). For example, the communication interface 160 connects to the network 162 through a wireless or wired link for communication with the external device. Examples of the wireless communication technology may include Wi-Fi, Bluetooth (BT), Near Field Communication (NFC), GPS, and cellular communication technology (e.g. Long Term Evolution (LTE), LTE-Advanced (LTE-A), Code Division Multiple Access (CDMA), Wideband CDMA (WCDMA), Universal Mobile Telecommunication System (UMTS), Wireless-Broadband (WiBro), and General System for Mobile communications (GSM)). Examples of the wired communication technology may include Universal Serial Bus (USB), High Definition Multimedia Interface (HDMI), Recommended Standard 232 (RS-232), and Plain Old Telephone Service (POTS).

The network 162 may be a telecommunication network. The communication network may include at least one of a computer network, the Internet, the Internet of Things, and a telephone network. The communication protocol between the electronic device 101 and an external device (e.g. transport layer protocol, data link layer protocol, and physical layer protocol) may be supported by at least one of the applications 134, API 133, middleware 132, kernel 131, and communication interface 160.

The arithmetic and logic unit control module 170 may process at least some pieces of information acquired from the other elements (e.g., the processor 120, the memory 130, the input/output interface 140, and the communication interface 160), and may provide the processed information to a user through various methods. For example, using the processor 120 or independently of the processor 120, the arithmetic and logic unit control module 170 may control at least some functions of the electronic device 101 to allow the electronic device 101 to interact with another electronic device (e.g., the electronic device 104 or the server 106).

The arithmetic and logic unit control module 170 may calculate a weighting value based on a measured value of electric current consumed in response to an operating frequency and determine the operating frequency of an arithmetic and logic unit by applying the calculated weighting value. The arithmetic and logic unit control module 170 may calculate a weighting value for measuring the usage rate of an arithmetic and logic unit based on a measured value of electric current consumed in response to an operating frequency, measure the usage rate of the arithmetic and logic unit based on the calculated weighting value, and determine the operating frequency of the arithmetic and logic unit according to the measured usage rate of the arithmetic and logic unit. In various embodiments, an arithmetic and logic unit may be defined as the smallest unit of a device (e.g., a CPU) that can execute and process instructions in a processor and may be construed as the same meaning as a core. A processor may include at least one arithmetic and logic unit and may be defined as a unit that can be independently interfaced with other elements of a device.

Additional information on the arithmetic and logic unit control module 170 will be provided through FIG. 2 described below.

Figure 2:
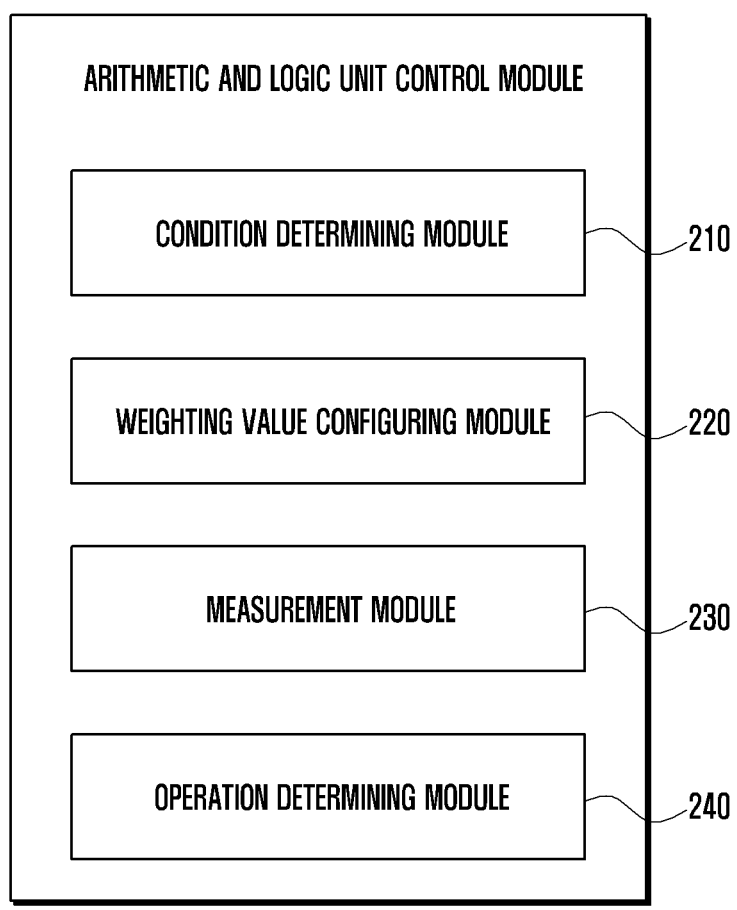
FIG. 2 is a block diagram of an arithmetic and logic unit control module of an electronic device, according to various embodiments of the present disclosure.

FIG. 2 is a block diagram 200 of an arithmetic and logic unit control module 170 of an electronic device (e.g., the electronic device 101), according to various embodiments of the present disclosure.

Referring to FIG. 2, the arithmetic and logic unit control module 170 may include a condition determining module 210, a weighting value configuring module 220, a measurement module 230, and an operation determining module 240. The condition determining module 210 may identify an operating frequency of an arithmetic and logic unit according to operation schedule information and a task execution environment. The condition determining module 210 may determine a measured value of electric current consumed in response to the operating frequency, or more particularly and in various embodiments, an electric current consumption value based on electric current consumption information for each frequency (e.g., a frequency-current consumption mapping table).

Therefore, according to various embodiments, the electronic device 101 may store a frequency-current consumption mapping table. The frequency-current consumption mapping table represents an electric current characteristic of the arithmetic and logic unit according to a change in the operating frequency of the arithmetic and logic unit. For example, the frequency-current consumption mapping table may comprise empirical data obtained by changing the operating frequency of the arithmetic and logic unit and then measuring an electric current value consumed according to the changed operating frequency. A plurality of frequency-current consumption mapping tables may be configured according to types of arithmetic and logic units constituting the electronic device. For example, in cases where the electronic device includes a lower-performance core and a higher-performance core, a table representing electric current consumption characteristics according to frequencies during operation of the lower-performance core and a table representing electric current consumption characteristics according to frequencies during operation of the higher-performance core may be configured/generated/stored.

According to various embodiments, the electronic device 101 may further include a table configuring module (not illustrated) for configuring a frequency-current consumption mapping table. The table configuring module may determine whether a frequency-current consumption mapping table has been set as a default.

In cases where a frequency-current consumption mapping table has not been set as a default, the table configuring module may display notification information for generating a frequency-current consumption mapping table on a display when the electronic device is operated (e.g., booted). When a user input is detected for requesting generation of such a table, the table configuring module may change the operating mode of the electronic device into a table configuration mode. The table configuring module may measure electric current consumption of a battery for at least one and/or each operating frequency and generate a frequency-current consumption mapping table based on the measured electric current consumption.

According to various embodiments, in cases where a frequency-current consumption mapping table has been set as a default, the table configuring module, when the electronic device is booted, may measure the electric current consumption of the battery for each operating frequency and reflect the measured electric current consumption in the frequency-current consumption mapping table to update the table.

According to various embodiments, the table configuring module may measure electric current consumption of the battery in response to a user input event during operation of the electronic device and compare the measured electric current consumption with electric current consumption recorded in the frequency-current consumption mapping table in relation to an operating frequency when the user input event is generated. While the electronic device is being operated in response to the user input event, the table configuring module may measure electric current consumption and reflect the measurement result in the frequency-current consumption mapping table to change the table.

According to various embodiments, in cases where the operating frequency of the arithmetic and logic unit is changed, the condition determining module 210 may determine an (electric)current consumption value corresponding to the changed operating frequency through the frequency-current consumption mapping table and the changed operating frequency and transfer the determined current consumption value to the weighting value configuring module 220. The weighting value configuring module 220 may calculate a weighting value provided to a load measurement function (e.g., an arithmetic and logic unit load measurement function, an arithmetic and logic unit usage rate measurement function, or a task load measurement function) based on the current consumption value corresponding to the operating frequency. For example, the weighting value configuring module 220 may calculate the weighting value using an algorithm for determining a weighting value according to a change in the current consumption value.

More particularly, according to various embodiments, the weighting value configuring module 220 may calculate a constant value that is proportional to an operating frequency and a weighting value reflecting a current consumption value for each operating frequency. When the operating frequency is changed, the weighting value configuring module 220 may change the weighting value according to a current consumption value corresponding to the changed operating frequency.

The measurement module 230 may measure a load value or a usage rate of the arithmetic and logic unit using the calculated weighting value.

According to an embodiment, the measurement module 230 may determine whether a predefined measurement function has been implemented to measure a task (or arithmetic and logic unit) load or the usage rate of the arithmetic and logic unit. Note that a processor carries out the task(s) and processes that are running on a given electronic device. In cases where the predefined measurement function has been implemented, the measurement module 230 may make a modification to reflect a weighting value reflecting a current consumption value in the predefined measurement function. In cases where the predefined measurement function has not been implemented, the measurement module 230 may generate a measurement function based on the weighting value reflecting the current consumption value.

For example, a measurement function for measuring the task load may be implemented by Equation 1 below.

$$Lp=(Wf+\alpha)*(P0+P1*Y+P2*Y2+P3*Y3+\ldots)$$  Equation 1

Here, $L_p$ denotes a load value, and $W_f$ denotes a weighting value for an operating frequency. $P_n$ (n=0, 1, . . . ) are parameters representing an objective function configured to consider electric current consumption characteristics, and the parameters may be differently determined by electric current characteristics of hardware. Y denotes measurement data used to determine an operating frequency. For example, Y may be a usage rate of an arithmetic and logic unit (e.g., a CPU); however, Y may also be a load value of each task. The measurement module 230 may reflect a constant value proportional to an operating frequency and an electric current value consumed in response to the operating frequency in the measurement function.

According to various embodiments, in cases where an operating frequency is changed, the measurement module 230 may measure a load value or a usage rate of the arithmetic and logic unit again based on a weighting value varied with the changed operating frequency.

The measurement module 230 may measure the usage frequency of the arithmetic and logic unit or may monitor a currently processed task or a generated task to measure a load value of the task (or the whole load value of the arithmetic and logic unit), and may transfer the measurement result to the operation determining module 240.

According to a usage frequency of the arithmetic and logic unit, the operation determining module 240 may determine an operating frequency at which the arithmetic and logic unit should or must be used. The operation determining module 240 may select an arithmetic and logic unit to process a task according to a load value and allocate the task to the selected arithmetic and logic unit.

According to various embodiments, in cases where the usage rate of the arithmetic and logic unit is greater than a predetermined threshold value, the operation determining module 240 may change the operating frequency of the arithmetic and logic unit to an operating frequency higher than the set operating frequency. The operation determining module 240 may monitor the usage rate of the arithmetic and logic unit and determine whether the usage rate of the arithmetic and logic unit varies. When the usage rate of the arithmetic and logic unit varies, the operation determining module 240 may change the operating frequency based on the varied usage rate. Thus, in various embodiments, the operating frequency of the arithmetic and logic unit can be adjusted based on a usage rate.

According to various embodiments, in cases where the task load exceeds a predetermined threshold value, the operation determining module 240 may allocate the task exceeding the threshold value to a high-performance "big" core (e.g., a Cotex-A15) to process the task, and may allocate a task having a task load lower than the threshold value to a low-power "little" core (e.g., a Cortex-A7) to process the task. The operation determining module 240 may monitor the load of the task and determine whether the load value is varied. When the load value varies, the operation determining module 240 may migrate the task from the allocated arithmetic and logic unit to another arithmetic and logic unit based on the varied load value. Thus, in various embodiments, a variety of arithmetic and logic units can be selected based on a task load. Moreover, as a task load increases, higher performance arithmetic logic units (having faster or higher operating frequencies) can be selected in response to increasing task loads, while lower performance arithmetic logic units having slower or lower operating frequencies) can be selected in response to decreasing task loads.

Figure 3:
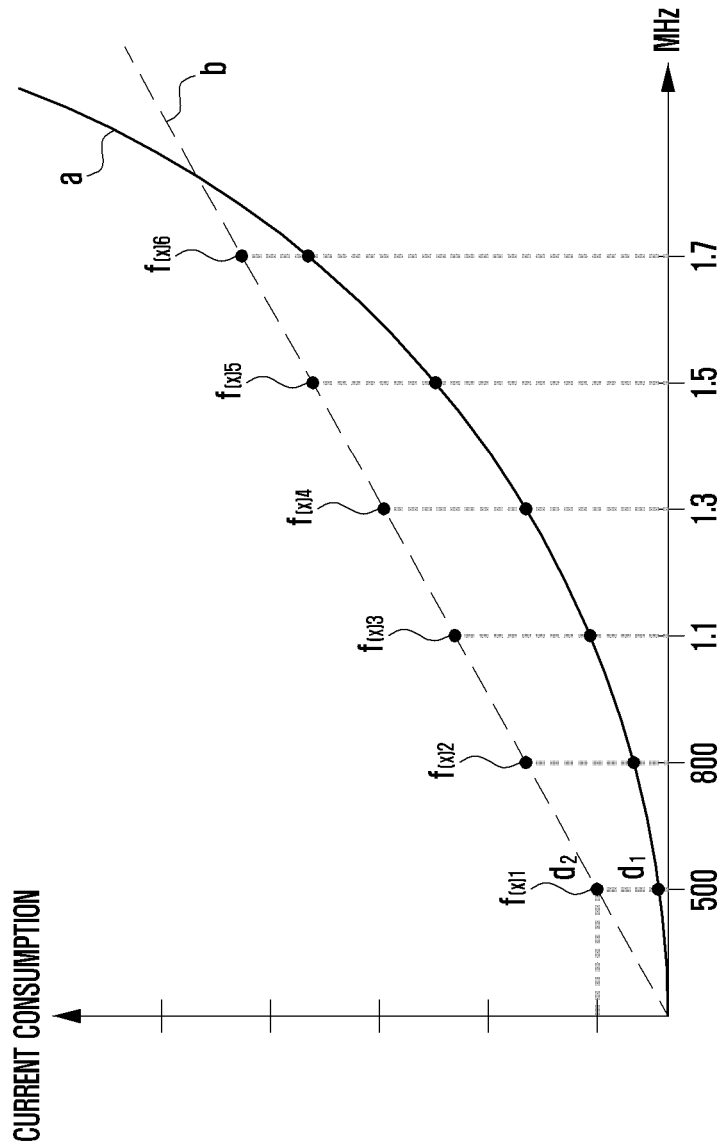
FIG. 3 is a graph illustrating electric current consumption according to a variation in an operating frequency, according to various embodiments of the present disclosure.

FIG. 3 is a graph illustrating electric current consumption according to a variation in an operating frequency, according to various embodiments of the present disclosure.

Referring to FIG. 3, arithmetic and logic units according to various embodiments may be operated under the condition of different operating frequencies. The arithmetic and logic units may process a task allocated thereto by an instruction. The task means a job executed in its own predetermined program area (e.g., a code, a stack, etc.). For example, the arithmetic and logic units may be of different types such as an X86, an X64, an ARM, a GPU, and a DSP. The different types of arithmetic and logic units may have different electric current consumptions for operation due to hardware characteristics and manufacturing materials thereof. In addition, the electric current consumptions of the arithmetic and logic units at a particular frequency may increase or decrease rapidly.

In general, when an operating frequency increases at a predetermined interval, electric current consumption may be predicted to increase in proportion to the frequency increment. An electronic device, when measuring task load or a usage rate of an arithmetic and logic unit, may assign a weighting value by reflecting the electric current consumption proportional to the frequency increment. For example, in the graph illustrated in FIG. 3, "a" represents a substantial measurement result of electric current consumption depending upon a variation in an operating frequency. It may be identified that electric current consumption of an arithmetic and logic unit depending upon an operating frequency may be substantially different at particular frequencies according to a hardware characteristic of the arithmetic and logic unit as represented by "a."

The electronic device may measure electric current consumption for each operating frequency and store a frequency-current consumption mapping table configured on the basis of the measurement result. When measuring the usage rate of the arithmetic and logic unit or a load value of a task (e.g., execution of an application), the electronic device may identify electric current consumption through the frequency-current consumption mapping table and calculate a weighting value to which the electric current consumption is applied.

The electronic device may configure a load measurement function based on the weighting value calculated according to the operating frequency to achieve a characteristic represented by the line "b" of FIG. 3, and may measure a load value based on the configured load measurement function. For example, the electronic device may calculate a weighting value based on current consumption for 500 MHz and implement a function $f_{(x)1}$, having a current consumption characteristic of d1 to d2 for 500 MHz, based on the calculated weighting value. The electronic device may implement functions $f_{(x)2}$, $f_{(x)3}$, $f_{(x)4}$, $f_{(x)5}$, and $f_{(x)6}$ according to operating frequencies such that respective electric current consumption characteristics are reflected.

Figure 4:
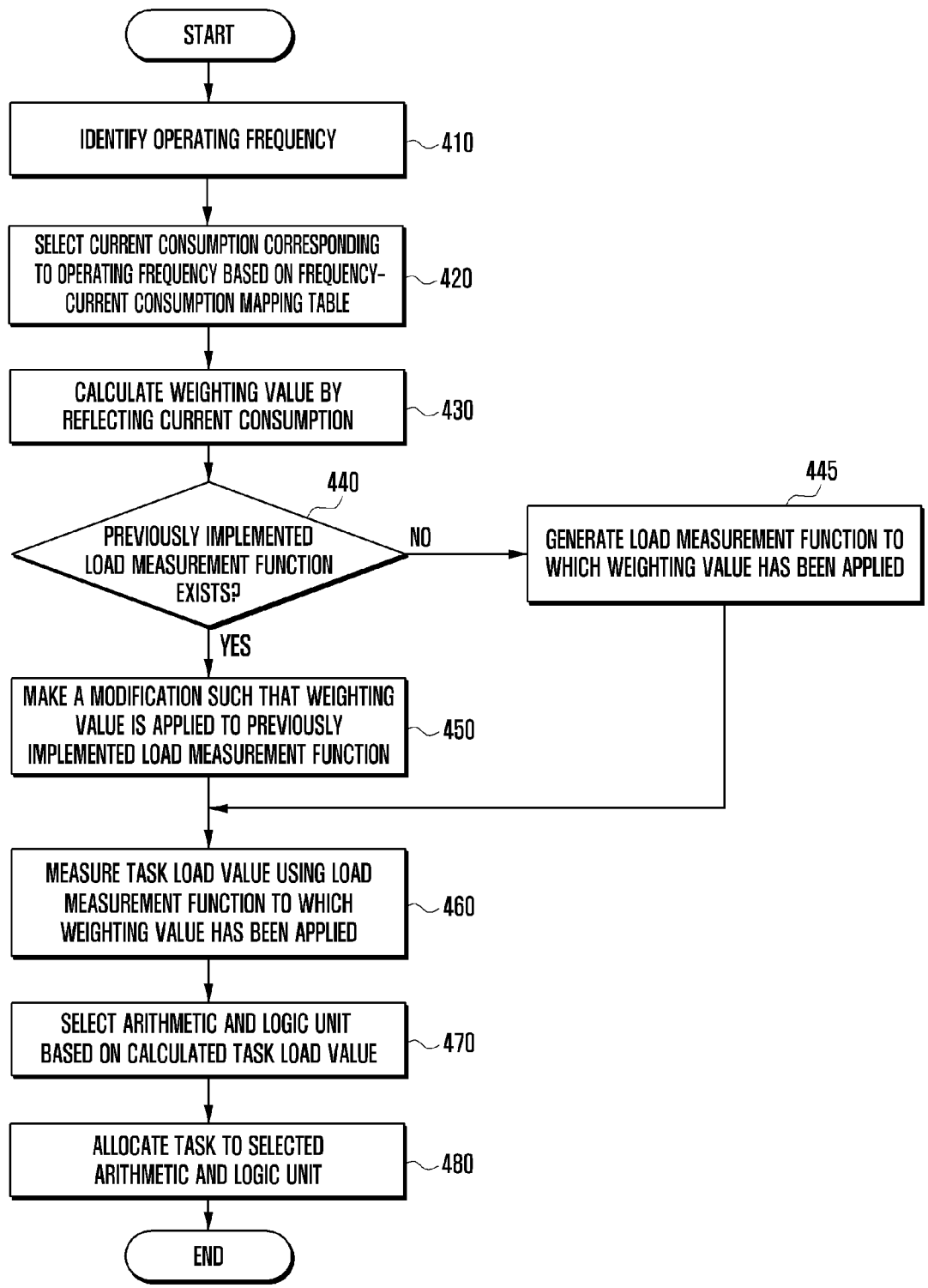
FIG. 4 is a flowchart illustrating a method of controlling an operation of an arithmetic and logic unit by an electronic device, according to various embodiments of the present disclosure.

FIG. 4 is a flowchart illustrating a method of controlling an operation of an arithmetic and logic unit by an electronic device, according to various embodiments of the present disclosure.

Referring to FIG. 4, in step 410, the electronic device may identify an operating frequency of an arithmetic and logic unit by confirming an operating condition of a task according to various pieces of predefined schedule information or conditions.

In step 420, the electronic device may select an electric current consumption corresponding to the identified operating frequency using a stored frequency-current consumption mapping table. For example, in cases where a task is requested to be executed at an operating frequency of 1.1 MHz, the electronic device may select a current consumption value recorded in the table in response to the operating frequency of 1.1 MHz.

In step 430, the electronic device may calculate a weighting value based on the selected electric current consumption. The weighting value is a value to be assigned to a load measurement function and may be reflected in the load measurement function for an electric current consumption characteristic proportional to a change in the operating frequency.

In step 440, the electronic device may determine whether a predefined load measurement function has been implemented. When it is determined that the predefined load measurement function has been implemented, the electronic device may, in step 450, make a modification such that the calculated weighting value is applied to the load measurement function. When it is determined that the predefined load measurement function has not been implemented, the electronic device may, in step 445, generate a load measurement function by applying the calculated weighting value.

According to various embodiments, the electronic device may calculate a weighting value according to electric current consumption previously measured for each operating frequency and configure a load measurement function based on the calculated weighting value, whereby the load measurement function may vary with the operating frequency.

In step 460, the electronic device may measure a task load value using the load measurement function to which the weighting value depending upon the operating frequency has been applied. In step 470, based on the calculated task load value, the electronic device may select an arithmetic and logic unit to process a task. For example, the electronic device may select a high-performance arithmetic and logic unit in cases where the load value is larger than a threshold value and may select a lower-performance arithmetic and logic unit in cases where the load value is smaller than the threshold value. The high-performance arithmetic and logic unit may operate at a frequency that is greater than the lower-performance arithmetic and logic unit. Thus, an arithmetic and logic unit may be selected based upon a load value.

In step 480, the electronic device may allocate a task to the selected arithmetic and logic unit and to allow the selected unit to process the task.

Figure 5:
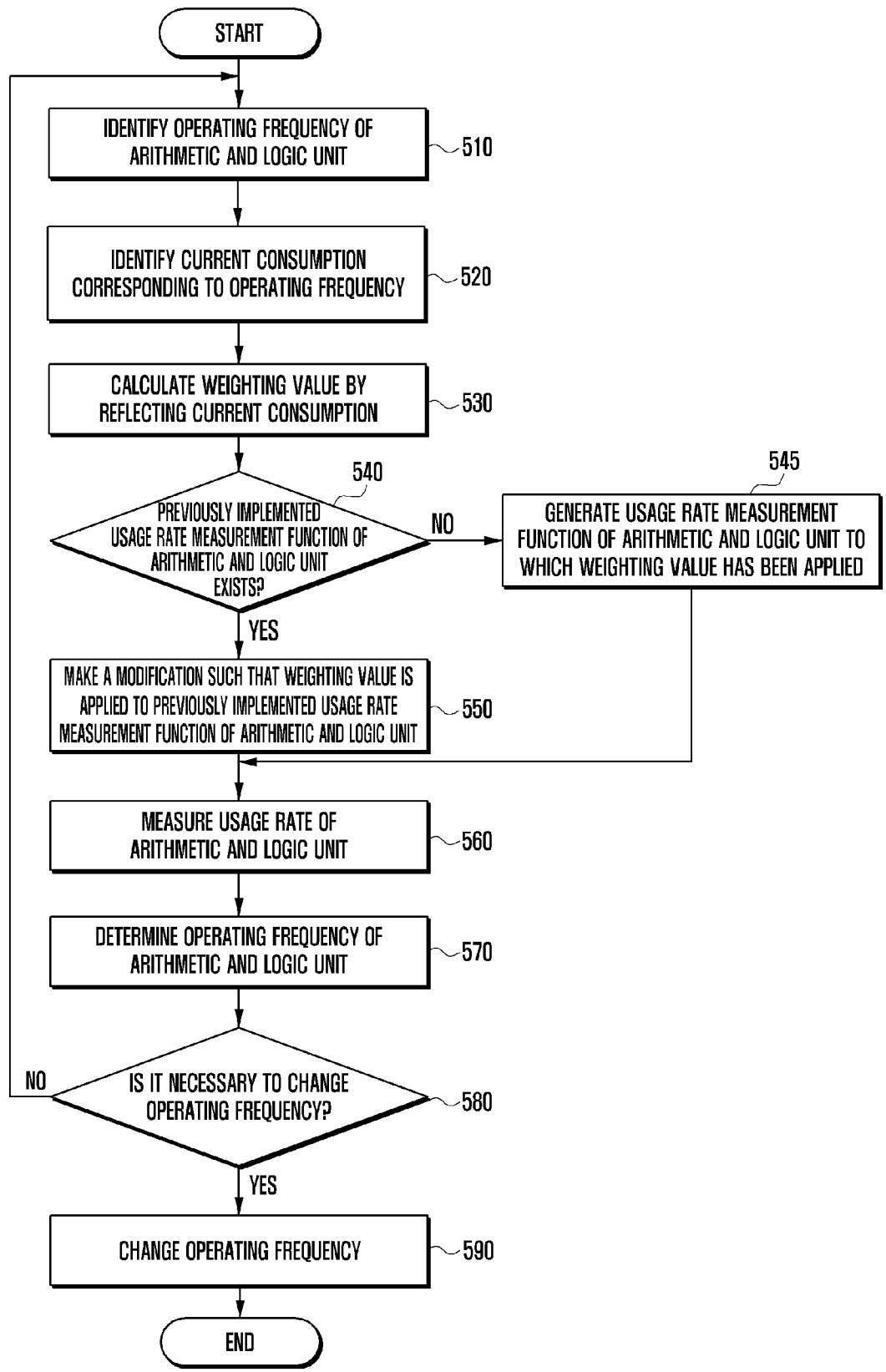
FIG. 5 is a flowchart illustrating a method of controlling an operation of an arithmetic and logic unit by an electronic device, according to various embodiments of the present disclosure.

FIG. 5 is a flowchart illustrating a method of controlling an operation of an arithmetic and logic unit by an electronic device, according to various embodiments of the present disclosure.

Referring to FIG. 5, in step 510, the electronic device may identify an operating frequency of an arithmetic and logic unit.

In step 520, the electronic device may identify electric current consumption corresponding to the identified operating frequency using a frequency-current consumption mapping table. In step 530, the electronic device may calculate a weighting value based on the selected electric current consumption.

In step 540, the electronic device may determine whether a predefined usage rate measurement function of the arithmetic and logic unit has been implemented. When it is determined that the predefined usage rate measurement function has been implemented, the electronic device may, in step 550, make a modification such that the calculated weighting value is applied to the predefined usage rate measurement function of the arithmetic and logic unit. When it is determined that the predefined usage rate measurement function (e.g., load measurement function) has not been implemented, the electronic device may, in step 545, generate a usage rate measurement function by applying the calculated weighting value.

In step 560, the electronic device may measure a usage rate of the arithmetic and logic unit using the usage rate measurement function to which the weighting value depending upon the operating frequency has been applied. In step 570, the electronic device may determine an operating frequency of the arithmetic and logic unit according to the measured usage rate of the arithmetic and logic unit. In step 580, the electronic device may determine whether to change the operating frequency. When it is determined that the operating frequency has to be changed, the electronic device may, in step 590, change the operating frequency into an operating frequency determined according to the usage rate of the arithmetic and logic unit. When the operating frequency does not have to be changed, the electronic device may return to step 510.

Figure 6:
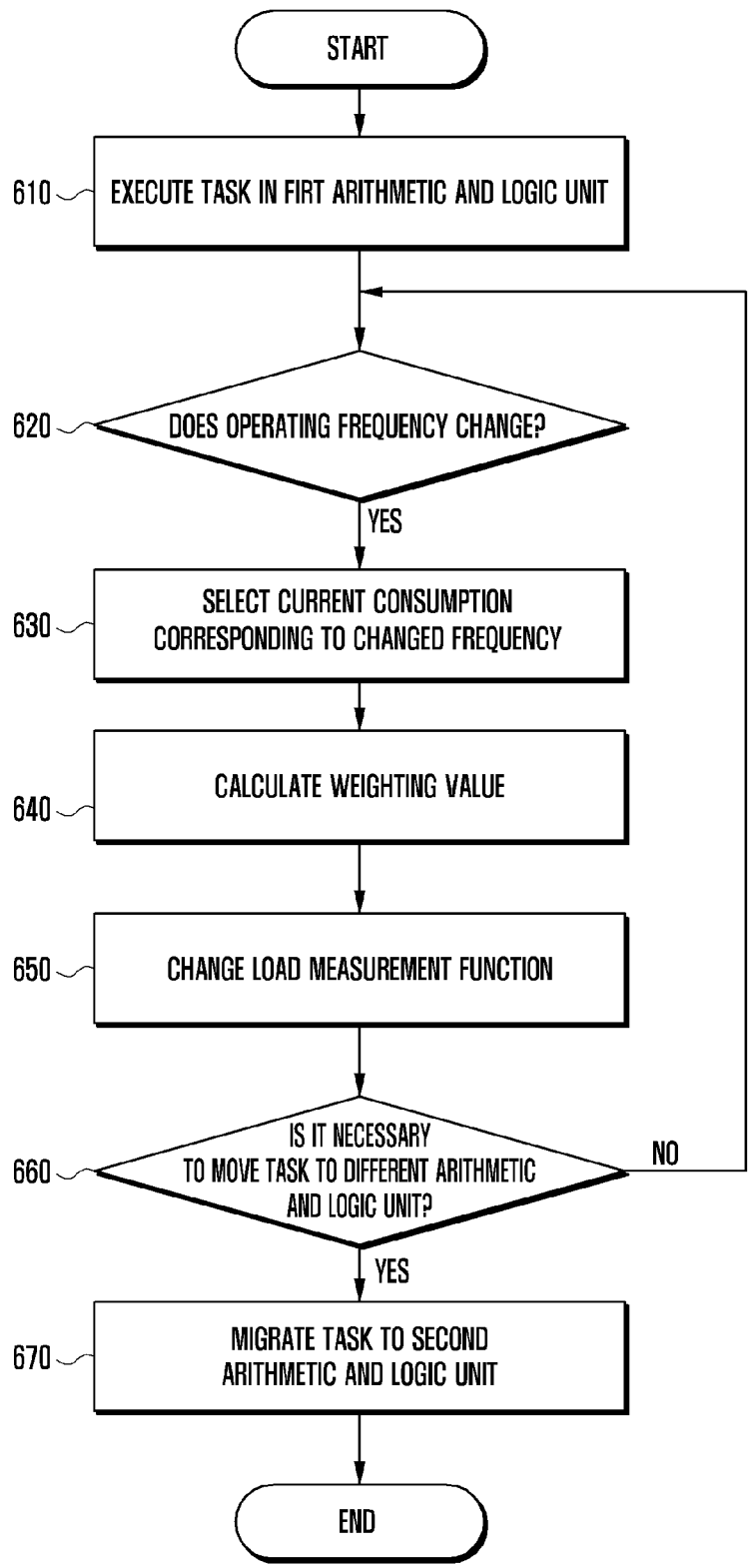
FIG. 6 is a flowchart illustrating a method of controlling an operation of an arithmetic and logic unit by an electronic device, according to various embodiments of the present disclosure.

FIG. 6 is a flowchart illustrating a method of controlling an operation of an arithmetic and logic unit by an electronic device, according to various embodiments of the present disclosure.

Referring to FIG. 6, in step 610, the electronic device may execute a task by allocating the task to a first arithmetic and logic unit based on a load value. In step 620, the electronic device may monitor the first arithmetic and logic unit to determine whether an operating frequency is changed for the execution of the task.

When the operating frequency changes, the electronic device may, in step 630, identify the changed operating frequency and identify electric current consumption corresponding to the changed operating frequency through a frequency-current consumption mapping table.

In step 640, the electronic device may recalculate a weighting value based on the selected electric current consumption. In step 650, the electronic device may modify or change a load measurement function based on the recalculated weighting value. The electronic device may measure a load value using the modified or changed load measurement function.

In step 660, based on the task load measurement result, the electronic device may determine whether to move the task to a different arithmetic and logic unit. Thus, in various embodiments, as a usage rate of an arithmetic and logic unit changes, the operating frequency of the arithmetic and logic unit may be adjusted up or down. Similarly, in various embodiments, as the task load of an arithmetic logic unit changes, one or more tasks may be moved or assigned to one or more different arithmetic logic units. In cases where the task has to be moved to a different arithmetic and logic unit, the electronic device may migrate the task executed in the first arithmetic and logic unit to a second arithmetic and logic unit in step 670. When it is determined based on the task load measurement result that the task does not have to be moved to a different arithmetic and logic unit, the electronic device may return to step 620 to monitor whether the operating frequency is changed.

Figure 7:
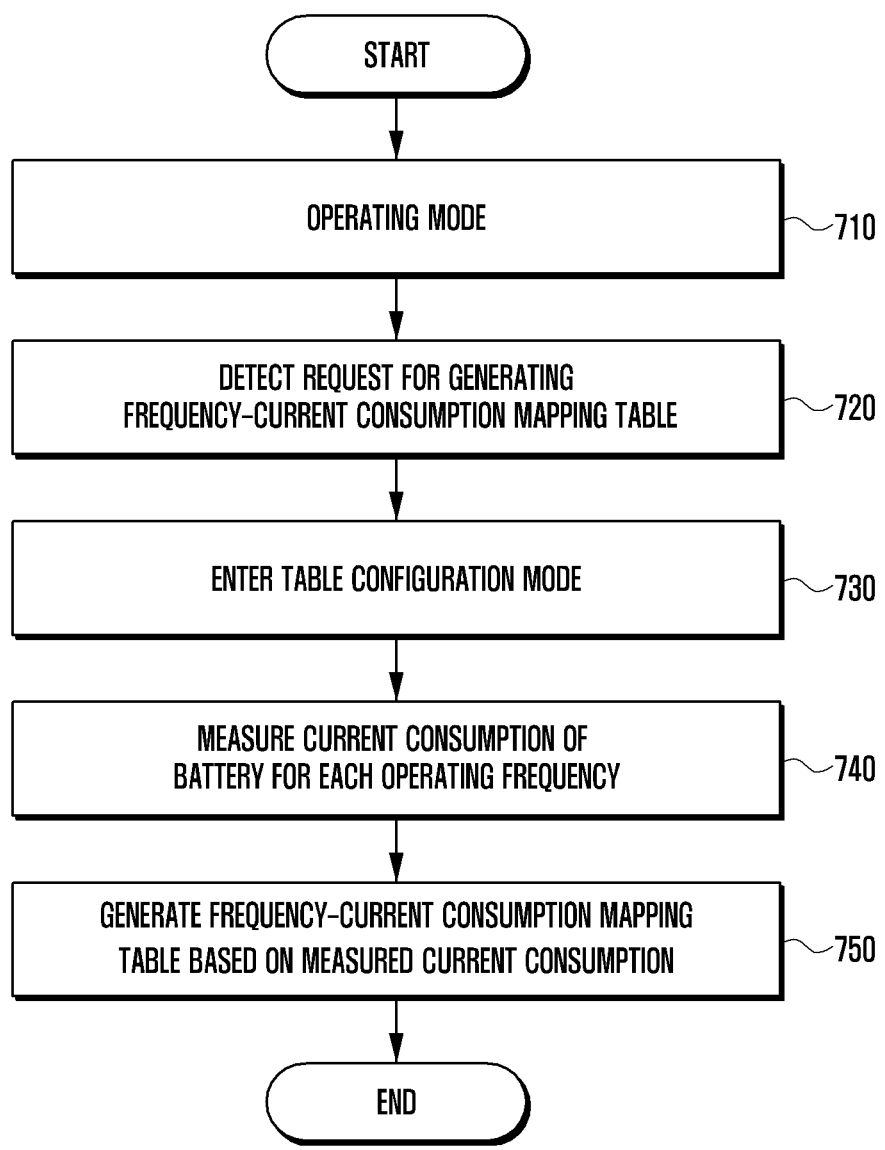
FIG. 7 is a flowchart illustrating a method of configuring a current consumption table for an operation of an arithmetic and logic unit, according to various embodiments of the present disclosure.

FIG. 7 is a flowchart illustrating a method of configuring a current consumption table for an operation of an arithmetic and logic unit, according to various embodiments of the present disclosure.

Referring to FIG. 7, in step 710, an electronic device may be operated in an operating mode. For example, the operating mode may be a booting state of the electronic device or a state in which the electronic device is being driven by power supplied thereto.

In step 720, the electronic device may detect an input for requesting generation of a frequency-current consumption mapping table.

According to various embodiments, the electronic device may determine whether a frequency-current consumption mapping table has been set as a default. For example, when the electronic device is booted, the electronic device may identify whether a frequency-current consumption mapping table has been stored therein. When it is determined that a frequency-current consumption table has not been stored in the electronic device, the electronic device may display notification information for identifying generation of a table on a display. When detecting a user input for requesting generation of a table, the electronic device may enter a table generation mode from the operating mode.

According to various embodiments, in cases where a frequency-current consumption mapping table has been set as a default, the electronic device may determine whether to update the frequency-current consumption mapping table, and may measure an electric current value consumed therein to update the frequency-current consumption mapping table.

In cases where a request for generating a frequency-current consumption mapping table is detected, the electronic device may enter a table configuration mode in step 730 and may measure electric current consumption of a battery for each of a plurality of operating frequencies in step 740. The electronic device may record or store to a memory 130 current electric consumption measured in response to each operating frequency to generate a frequency-current consumption mapping table in step 750.

Figure 8:
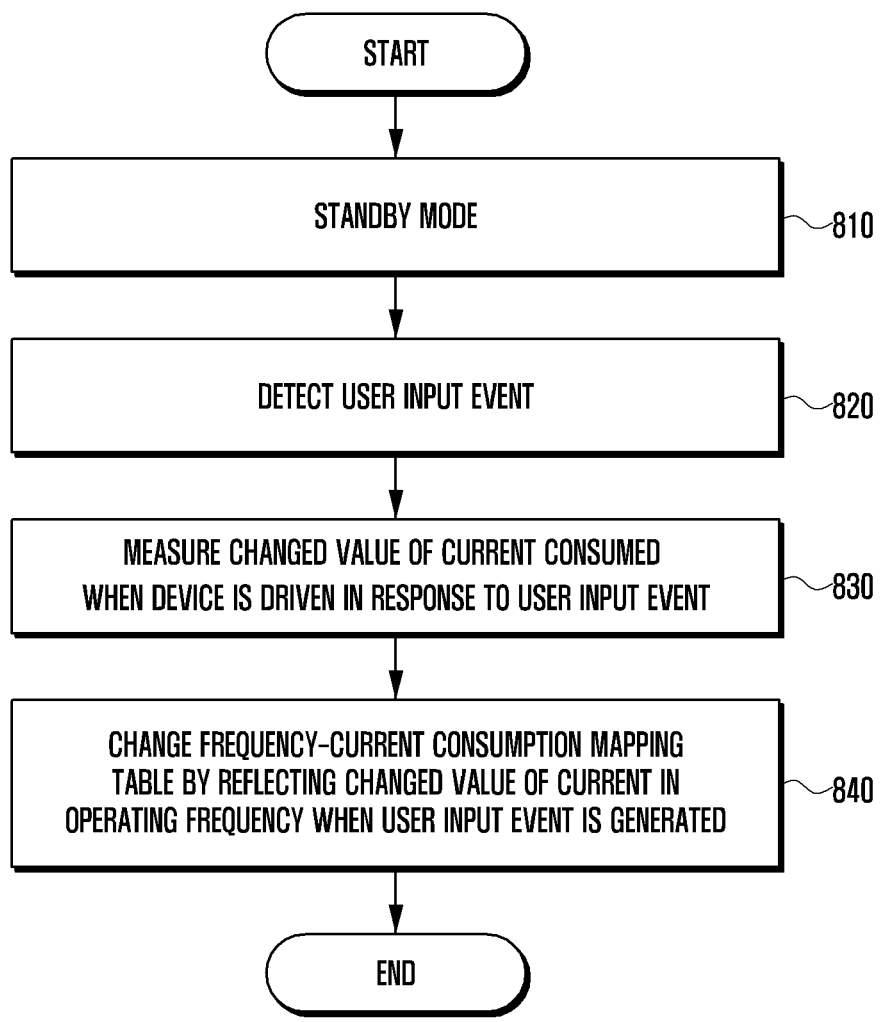
FIG. 8 is a flowchart illustrating a method of changing a current consumption table for an operation of an arithmetic and logic unit, according to various embodiments of the present disclosure.

FIG. 8 is a flowchart illustrating a method of changing a current consumption table for an operation of an arithmetic and logic unit, according to various embodiments of the present disclosure.

Referring to FIG. 8, in step 810, an electronic device may operate in a standby mode (e.g., operation mode). For example, the standby mode (e.g., operation mode) may be a state in which the electronic device stands ready for receiving a user input while being driven. In step 820, the electronic device may detect a user input event. For example, the electronic device may detect a screen transition request input, such as a flick, or an input for requesting execution of a particular application in a particular application mode.

In step 830, the electronic device may be driven in response to the user input event and may measure a changed value of electric current consumed in a battery. In step 840, the electronic device may change a frequency-current consumption mapping table by reflecting the changed value of the electric current in the operating frequency when the user input event is generated. For example, assuming that a current consumption value corresponding to a particular operating frequency is a, an electric current value consumed when the electronic device is driven in response to the user input event may be ±α. When driven in response to the user input event, the electronic device may measure substantial electric current consumption and may make a change such that the measured electric current consumption is reflected in the frequency-current consumption mapping table.

Figure 9:
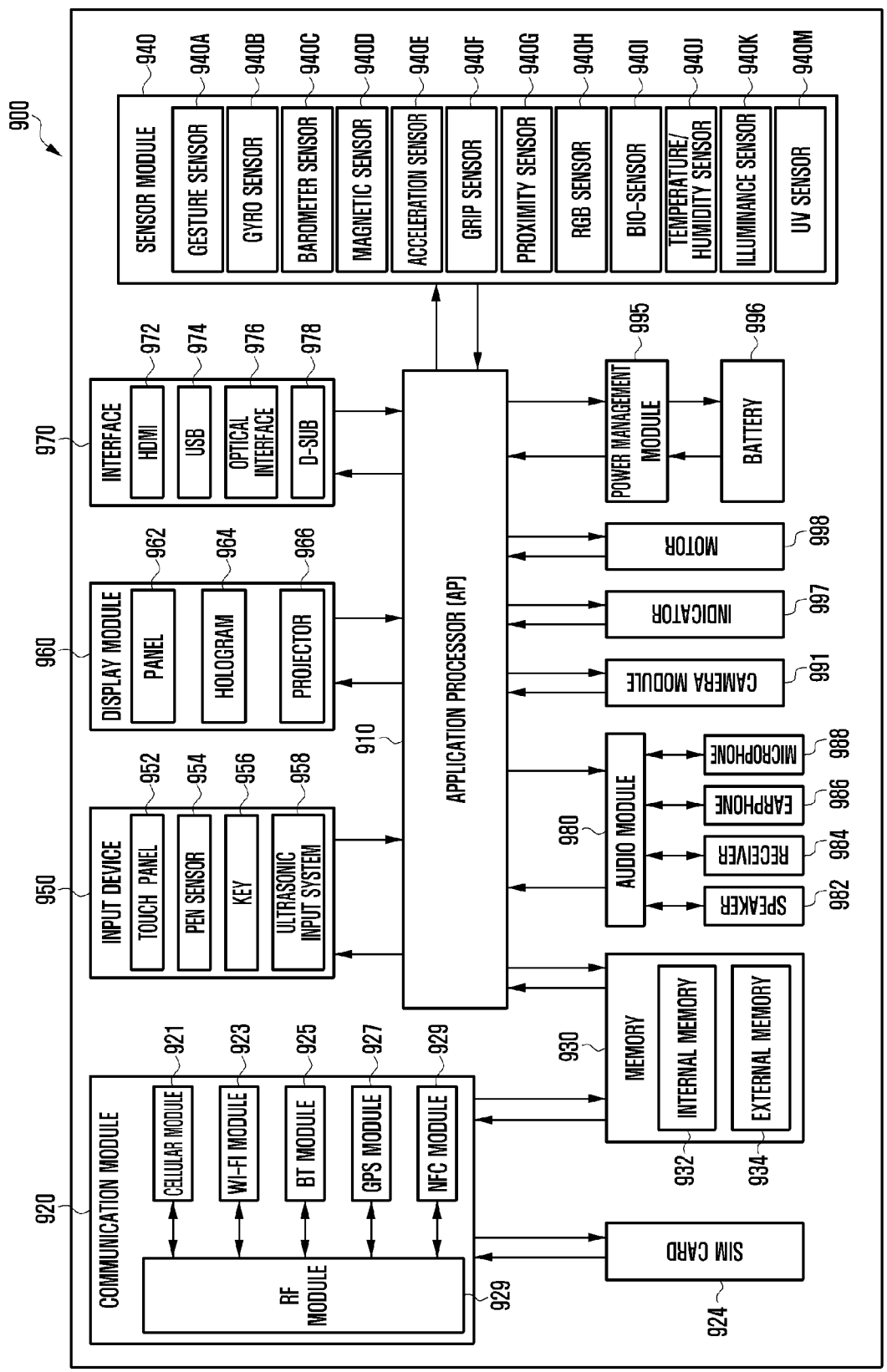
FIG. 9 is a block diagram of an electronic device according to various embodiments of the present disclosure.

FIG. 9 is a block diagram illustrating a configuration of the electronic device according to an embodiment of the present disclosure.

Referring to FIG. 9, the electronic device 900 may include an processor 910, a communication module 920, a Subscriber Identity Module (SIM) card 924, a memory 930, a sensor module 940, an input device 950, a display 960, an interface 970, an audio module 980, a camera module 991, a power management module 995, a battery 996, an indicator 997, and a motor 998.

The processor 910 may include an Application Processor (AP) 911 and a Communication Processor (CP) 913, and may operate an Operating System (OS) and/or application programs to control a plurality of hardware and/or software components connected to the AP 910 and perform data-processing and operations on multimedia data. For example, the AP 910 may be implemented in the form of System on Chip (SoC). According to an embodiment, the AP 910 may include a Graphic Processing Unit (GPU) (not shown).

The communication module 920 (e.g. communication interface 160) may perform data communication with other electronic devices (e.g. electronic device 104 and server 106) through a network. According to an embodiment, the communication module 920 may include a cellular module 921, a Wi-Fi module 923, a BT module 925, a GPS module 927, an NFC module 928, and a Radio Frequency (RF) module 929.

The cellular module 921 is responsible for voice and video communication, text messaging, and Internet access services through a communication network (e.g. LTE, LTE-A, CDMA, WCDMA, UMTS, WiBro, and GSM networks). The cellular module 921 may perform identification and authentication of electronic devices in the communication network using the SIM card 924. The cellular module 921 may perform at least one of the functions of the AP 910. For example, the cellular module 921 may perform at least a part of the multimedia control function.

The cellular module 921 may be implemented in the form of SOC. Although the cellular module 921, the memory 930, and the power management module 995 are depicted as independent components separated from the AP 910, the present disclosure is not limited thereto but may be embodied in a way that the AP includes at least one of the components (e.g. cellular module 921).

Each of the AP 910 and the cellular module 921 may load a command or data received from at least one of the components on a non-volatile or volatile memory and process the command or data. The AP 910 or the cellular module 921 may store the data received from other components or generated by at least one of other components in the non-volatile memory.

Each of the Wi-Fi module 923, the BT module 925, the GPS module 927, and the NFC module 928 may include a processor for processing the data it transmits/receives. Although the cellular module 921, the Wi-Fi module 923, the BT module 925, the GPS module 927, and the NFC module 928 are depicted as independent blocks, at least two of them (e.g. communication processor corresponding to the cellular module 921 and Wi-Fi processor corresponding to the Wi-Fi module 923) may be integrated in the form of SoC.

The RF module 929 is responsible for data communication, e.g. transmitting/receiving RF signals. Although not depicted, the RF module 929 may include a transceiver, a Power Amp Module (PAM), a frequency filter, and a Low Noise Amplifier (LNA). The RF module 929 also may include the elements for transmitting/receiving electric wave in free space, e.g. conductor or conductive wire. Although FIG. 9 is directed to the case where the Wi-Fi module 923, the BT module 925, the GPS module 927, and the NFC module 928 are sharing the RF module 929, the present disclosure is not limited thereto but may be embodied in a way that at least one of the Wi-Fi module 923, the BT module 925, the GPS module 927, and the NFC module 928 transmits/receives RF signals an independent RF module.

The SIM card 924 may be designed so as to be inserted into a slot formed at a predetermined position of the electronic device. The SIM card 924 may store unique identity information (e.g., Integrated Circuit Card Identifier (IC-CID)) or subscriber information (e.g., International Mobile Subscriber Identity (IMSI)).

The memory 930 (e.g. memory 130) may include at least one of the internal memory 932 and an external memory 934. The internal memory 932 may include at least one of a volatile memory (e.g. Dynamic Random Access Memory (DRAM), Static RAM (SRAM), Synchronous Dynamic RAM (SDRAM) or a non-volatile memory (e.g. One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, and NOR flash memory).

The internal memory 932 may be a Solid State Drive (SSD). The external memory 934 may be a flash drive such as Compact Flash (CF), Secure Digital (SD), micro-SD, Mini-SD, extreme Digital (xD), and Memory Stick. The external memory 934 may be functionally connected to the electronic device 901 through various interfaces. The electronic device 900 may include a storage device (or storage medium) such as hard drive.

The sensor module 940 may measure physical quantity or check the operation status of the electronic device 900 and convert the measured or checked information to an electric signal. The sensor module 940 may include at least one of gesture sensor 940A, Gyro sensor 940B, atmospheric pressure sensor 940C, magnetic sensor 940D, acceleration sensor 940E, grip sensor 940F, proximity sensor 940G, color sensor 940H (e.g. Red, Green, Blue (RGB) sensor), bio sensor 940I, temperature/humidity sensor 940J, illuminance sensor 940K, and Ultra Violet (UV) sensor 940M. Additionally or alternatively, the sensor module 940 may include E-nose sensor (not shown), Electromyography (EMG) sensor (not shown), Electroencephalogram (EEG) sensor (not shown), Electrocardiogram (ECG) sensor (not shown), Infrared (IR) sensor (not shown), iris sensor (not shown), and fingerprint sensor (not shown). The sensor module 940 may further include a control circuit for controlling at least one of the sensors included therein.

The input device 950 may include a touch panel 952, a (digital) pen sensor 954, keys 956, and an ultrasonic input device 958. The touch panel 952 may be one of capacitive, resistive, infrared, microwave type touch panel. The touch panel 952 may include a control circuit. In the case of the capacitive type touch panel, it is possible to detect physical contact or approximation. The touch panel 952 may further include a tactile layer. In this case, the touch panel 952 may provide the user with haptic reaction.

The (digital) pen sensor 954 may be implemented with a sheet with the same or similar way as touch input of the user or a separate recognition sheet. The keys 956 may include physical buttons, optical key, and keypad. The ultrasonic input device 958 is a device capable of checking data by detecting sound wave through a microphone 988 and may be implemented for wireless recognition. According to an embodiment, the electronic device 901 may receive the user input made by means of an external device (e.g. computer or server) connected through the communication module 920.

The display 960 (e.g. display module 150) may include a panel 962, a hologram device 964, and a projector (not shown). The panel 962 may be a Liquid Crystal Display (LCD) panel or an Active Matrix Organic Light Emitting Diodes (AMOLED) panel. The panel 962 may be implemented so as to be flexible, transparent, and/or wearable. The panel 962 may be implemented as a module integrated with the touch panel 952. The hologram device 964 may present 3-dimensional image in the air using interference of light. The projector 966 may project an image to a screen. The screen may be placed inside or outside the electronic device. According to an embodiment, the display 960 may include a control circuit for controlling the panel 962, the hologram device 964, and the projector.

The interface 970 may include a High-Definition Multimedia Interface (HDMI) 972, a USB 974, an optical interface 976, and a D0subminiature (D-sub) 978. The interface 970 may include the communication interface 160 as shown in FIG. 1. Additionally or alternatively, the interface 970 may include a Mobile High-definition Link (MHL) interface, a SD/MMC card interface, and infrared Data Association (irDA) standard interface.

The audio module 980 may convert sound to electric signal and vice versa. At least a part of the audio module 980 may be included in the input/output interface 140 as shown in FIG. 1. The audio module 980 may process the audio information input or output through the speaker 982, the receiver 984, the earphone 986, and the microphone 988.

The camera module 991 is a device capable of taking still and motion pictures and, may include at least one image sensor (e.g. front and rear sensors), a lens (not shown), and Image Signal Processor (ISP) (not shown), and a flash (e.g. LED or xenon lamp) (not shown).

The power management module 995 may manage the power of the electronic device 901. Although not shown, the power management module 995 may include a Power Management Integrated Circuit (PMIC), a charger Integrated Circuit (IC), a battery, and a battery or fuel gauge.

The PMIC may be integrated into an integrated circuit or SoC semiconductor. The charging may be classified into wireless charging and wired charge. The charger IC may charge the battery and protect the charger against overvoltage or overcurrent. According to an embodiment, the charger IC may include at least one of wired charger and wireless charger ICs. Examples of the wireless charging technology includes resonance wireless charging and electromagnetic wave wireless charging, and there is a need of extra circuit for wireless charging such as coil loop, resonance circuit, and diode.

The battery gauge may measure the residual power of the battery 996, charging voltage, current, and temperature. The battery 996 may store or generate power and supply the stored or generated power to the electronic device 900. The battery 996 may include a rechargeable battery or a solar battery.

The indicator 997 may display operation status of the electronic device 901 or a part of the electronic device, booting status, messaging status, and charging status. The motor 998 may converts the electronic signal to mechanical vibration. Although not shown, the electronic device 900 may include a processing unit (e.g. GPU) for supporting mobile TV. The processing unit for supporting the mobile TV may be able to processing the media data abiding by the broadcast standards such Digital Multimedia Broadcasting (DMB), Digital Video Broadcasting (DVB), and media flow.

As described above, the text display method and apparatus of an electronic device of the present disclosure is advantageous in terms of reducing a number of page scrolls by discerning the paragraphs included in a text document and folding the paragraphs to present parts of the respective paragraphs.

Also, the text display method and apparatus of an electronic device of the present disclosure is advantageous in terms of improving the legibility of the text in such a way of enlarging, when a folded paragraph is stretched, the font size of the paragraph or highlighting the paragraph.

The above enumerated components of the electronic device of the present disclosure may be implemented into one or more parts, and the names of the corresponding components may be changed depending on the kind of the electronic device. The electronic device of the present disclosure may include at least one of the aforementioned components with omission or addition of some components. The components of the electronic device of the present disclosure may be combined selectively into an entity to perform the functions of the components equally as before the combination.

The term "module" according to the embodiments of the disclosure, means, but is not limited to, a unit of one of software, hardware, and firmware or any combination thereof. The term "module" may be used interchangeably with the terms "unit," "logic," "logical block," "component," or "circuit." The term "module" may denote a smallest unit of component or a part thereof. The term "module" may be the smallest unit of performing at least one function or a part thereof. A module may be implemented mechanically or electronically. For example, a module may include at least one of Application-Specific Integrated Circuit (ASIC) chip, Field-Programmable Gate Arrays (FPGAs), and Programmable-Logic Device known or to be developed for certain operations.

According to various embodiments of the present disclosure, the devices (e.g. modules or their functions) or methods may be implemented by computer program instructions stored in a computer-readable storage medium. In the case that the instructions are executed by at least one processor (e.g. processor 90), the at least one processor may execute the functions corresponding to the instructions. The computer-readable storage medium may be the memory 130. At least a part of the programing module may be implemented (e.g. executed) by the processor 90. At least part of the programing module may include modules, programs, routines, sets of instructions, and processes for executing the at least one function.

The computer-readable storage medium includes magnetic media such as a floppy disk and a magnetic tape, optical media including a Compact Disc (CD) ROM and a Digital Video Disc (DVD) ROM, a magneto-optical media such as a floptical disk, and the hardware device designed for storing and executing program commands such as ROM, RAM, and flash memory. The programs commands include the language code executable by computers using the interpreter as well as the machine language codes created by a compiler. The aforementioned hardware device can be implemented with one or more software modules for executing the operations of the various embodiments of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

A module or a programming module according to the present invention may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Further, some operations may be executed in a different order, some of the operations may be omitted, or other operations may be added. According to various embodiments, in a storage medium having instructions stored therein, the instructions are set such that at least one processor performs at least one operation when the instructions are executed by the at least one processor, and in a method of controlling an operation of an arithmetic and logic unit, the at least one operations may include: determining an operating frequency of a task; calculating a weighting value based on a measured value of current consumed in response to the operating frequency; measuring a load value by applying the calculated weighting value; and selecting an arithmetic and logic unit to process the task according to the load value. Embodiments of the present disclosure provided in the present specifications and drawings are merely certain examples to readily describe the technology associated with embodiments of the present disclosure and to help understanding of the embodiments of the present disclosure, but may not limit the scope of the embodiments of the present disclosure. Therefore, in addition to the embodiments disclosed herein, the scope of the various embodiments of the present disclosure should be construed to include all modifications or modified forms drawn based on the technical idea of the various embodiments of the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, or a combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for".

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

In addition, an artisan understands and appreciates that a "processor" or "microprocessor" constitute hardware in the claimed invention. Under the broadest reasonable interpretation, the appended claims constitute statutory subject matter in compliance with 35 U.S.C. §101.

What is claimed is:

1. An electronic device comprising:
   at least one arithmetic and logic unit for processing a task; and
   a processor for controlling the arithmetic and logic unit, wherein the processor is configured to:
      identify an operating frequency of the arithmetic and logic unit processing the task;
      calculate a weighting value based on a measured value of electric current consumed when processing the task at the identified operating frequency;
      determine whether to allocate the task to a different arithmetic and logic unit based on the calculated weighting value; and
      if it is determined that the task is to be allocated to the different arithmetic and logic unit, allocating the task to the different arithmetic and logic unit.

2. The electronic device of claim 1, wherein the processor is further configured to: monitor whether the operating frequency changes, and
   when the operating frequency changes, recalculate the weighting value according to the electric current consumption.

3. The electronic device of claim 1, wherein the processor is further configured to:
   measure a load value of a task executed by the arithmetic and logic unit; and
   determine the operating frequency of the arithmetic and logic unit according to the load value.

4. The electronic device of claim 1, wherein the processor is configured to:
   measure a usage rate of the arithmetic and logic unit by applying the calculated weighting value; and
   determine the operating frequency of the arithmetic and logic unit according to the measured usage rate of the arithmetic and logic unit.

5. The electronic device of claim 4, wherein the processor is configured to:
   monitor whether the usage rate of the arithmetic and logic unit is changed, and
   change the operating frequency according to the usage rate of the arithmetic and logic unit when the usage rate of the arithmetic and logic unit changes.

6. The electronic device of claim 1, wherein the processor is configured to:
   generate a measurement function for measuring a usage rate based on the weighting value calculated by reflecting the measured value.

7. The electronic device of claim 5, wherein, when a measurement function has been previously implemented, the processor is configured to:
   make a modification such that the calculated weighting value is reflected in the previously implemented measurement function.

8. The electronic device of claim 1, further comprising:
   a storage module for storing a frequency-current consumption mapping table in which a measured value of electric current consumed for a plurality of frequencies is recorded,
   wherein the processor is configured to:
      measure an electric current value consumed in a battery for each of the plurality of frequencies when the electronic device is driven, and
      generate the frequency-current consumption mapping table based on the measured electric current value.

9. The electronic device of claim 8, wherein the processor is configured to:
   set the generated frequency-current consumption mapping table as a default, measure a changed value of electric current consumed in the battery when being operated in response to a user input event, and
   change the frequency-current consumption mapping table based on the changed value.

10. A method of controlling an operation of an arithmetic and logic unit, the method comprising:
    identifying an operating frequency of the arithmetic and logic unit processing a task;
    calculating, by a processor, a weighting value based on a measured value of electric current consumed when processing the task at the operating frequency;
    determining whether to allocate the task to a different arithmetic and logic unit based on the calculated weighting value; and
    if it is determined that the task is to be allocated to the different arithmetic and logic unit, allocating the task to the different arithmetic and logic unit.

11. The method of claim 10, further comprising:
    generating a measurement function for measuring a load value of the arithmetic and logic unit based on the weighting value; and
    measuring the load value using the generated measurement function,
    wherein at least one of the operating frequency or an arithmetic and logic unit is selected according to the load value.

12. The method of claim 11, wherein the measuring of the load value of the arithmetic and logic unit comprises:
    when a predefined load measurement function has been implemented, modifying the load measurement function to apply the weighting value, wherein a load value is measured using the modified load measurement function.

13. The method of claim 10, further comprising:
    generating a measurement function for measuring a usage rate of the arithmetic and logic unit based on the weighting value; and
    measuring the usage rate of the arithmetic and logic unit using the generated measurement function, wherein the operating frequency of the arithmetic and logic unit is determined based on the measured usage rate.

14. The method of claim 10, wherein the calculating of the weighting value comprises:
    calculating at least one of a weighting value for measuring a usage rate of the arithmetic and logic unit or a weighting value for measuring a load value of a task or a load value of the arithmetic and logic unit.

15. The method of claim 10, further comprises:

monitoring whether a usage rate of the arithmetic and logic unit changes; and when the usage rate of the arithmetic and logic unit is changed, changing the determined operating frequency according to the usage rate of the arithmetic and logic unit.

16. The method of claim 15, further comprising:

when the operating frequency changes, recalculating a weighting value according to electric current consumption corresponding to the changed operating frequency; and controlling the arithmetic and logic unit by applying the recalculated weighting value.

17. The method of claim 10, wherein the calculating of the weighting value comprises:

measuring electric current consumption depending upon a frequency change according to a type of the arithmetic and logic unit; and generating a frequency-current consumption mapping table based on the measured current consumption, wherein the weighting value is calculated by identifying electric current consumption corresponding to the operating frequency through the frequency-current consumption mapping table.

18. The method of claim 17, wherein the generating of the frequency-current consumption mapping table comprises:

setting the generated frequency-current consumption mapping table as a default;

measuring a changed value of electric current consumed in a battery when an electronic device is operated in response to a user input event; and changing the frequency-current consumption mapping table, set as the default, based on the changed value.

\* \* \* \* \*